Printed Specification Available
8201X
Cutting.
Spinning.
Patented May 15, 1834.
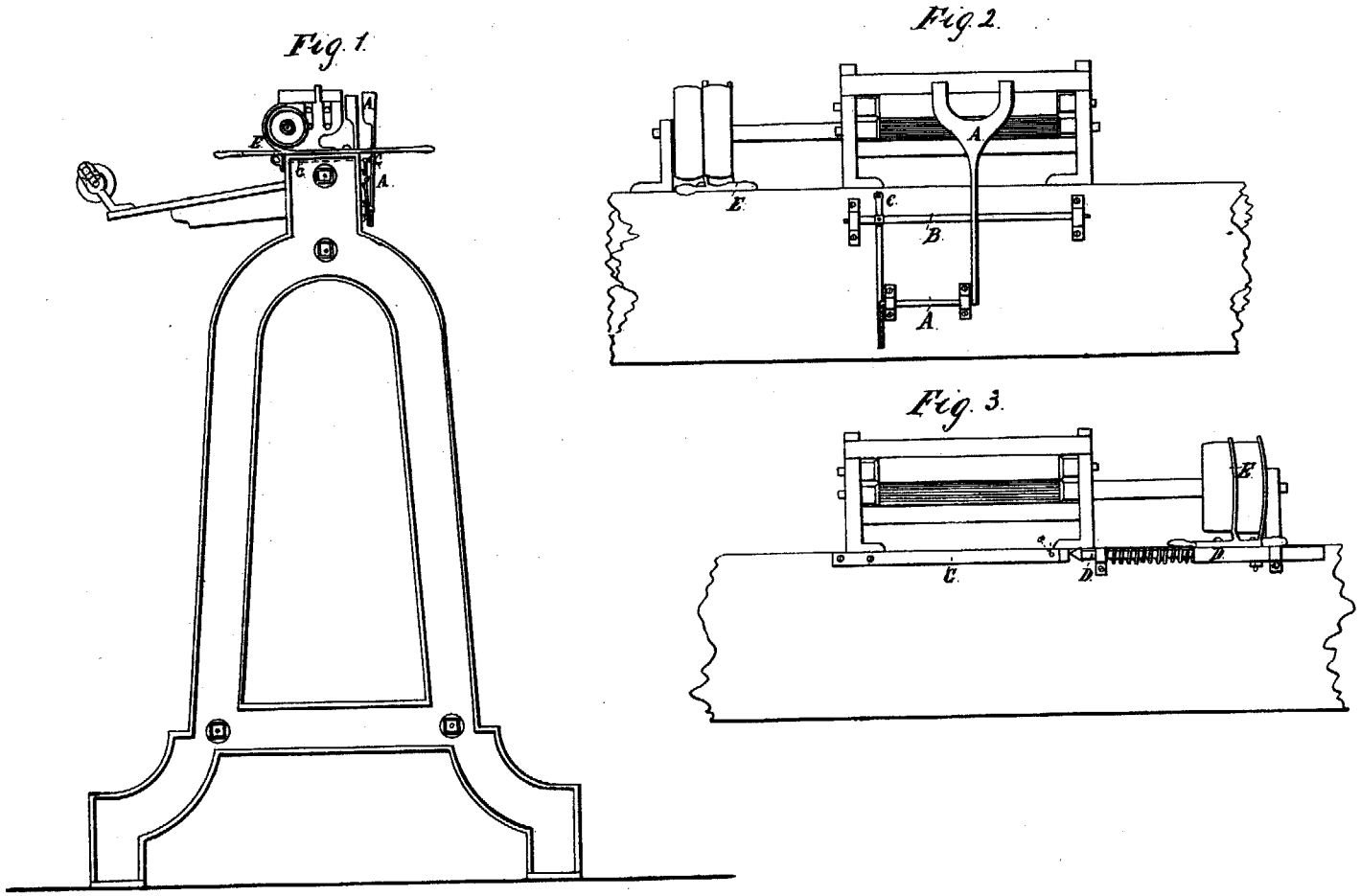
N. PETERS, PHOTO-LITHOGRAPHER, WASHINGTON, D. C.

5/15/1834 8201X

May 15. 1834 197

Lewis Cutting

The Schedule referred to in these Letters Patent and making part of the same containing a description in the words of the said Lewis Cutting himself of his improvement in the stop motion of the drawing frames used in Spinning Cotton.

To all to whom these presents shall come:
Be it known that I Lewis Cutting of Lowell in the County of Middlesex and State of Massachusetts, have invented a new and useful improvement in the stop motion of the drawing frame used in Spinning Cotton, and that the following is a full and exact description of the construction and operation of the said improvement as invented by me.

In the stop motion already in use, there is placed in front of the guide or trumpet which conducts the cotton into the drawing rollers, another guide made of tin, bent into a cylindrical shape, called a "Conductor", over the convex surface of which, the cotton passes and by its weight, holds it in its place; When the cotton lap leaves the tin conductor, either by breaking off or running out the conductor falls forward, and the lower part of the wire to which it is fastened, strikes against a pin projecting from an iron rod, and causes the rod to revolve. This revolution causes another wire, projecting from the rod, to act upon a latch, which bears against another rod, which last it leaves at liberty to slide, this it is caused to do by a spiral spring, and by its movement throws the belt which drives the frame, on to a loose pulley.
My improvement consists in substituting for the latch above mentioned a straight steel spring notched at the end so as to hold, in a similar notch made in the end of the rod with the spiral spring attached, and in connecting said spring by means of a wire with the revolving rod, so that when it has let the rod & spiral spring at liberty, the spring by its backward motion, acting on the revolving rod, and that on the foot of the wire which supports the conductor; will cause the latter to resume its upright position, thus saving the Drawing

5/15/1834 8201X

198.

time and labor, which by the old plan is required to replace it by hand, which is found in practice to produce a saving of twenty five per cent.

Now what I claim as new and as my invention, is by the application of a spring to operate on the conductor as above described, or as may be found most convenient, to cause it to resume its upright position, after it has thrown the frame out of gear.

In testimony that the foregoing is a true specification of my said improvement, I hereto subscribe my name, this 8th day of May 1834.

Witnesses
Richd Butt
Robt Clarke

Lewis Cutting

Exd [illegible]

[507 wds]

(Patented 15 May 1834)

39
17
---
117
39
---
507